US011955034B1

(12) United States Patent
Roe

(10) Patent No.: US 11,955,034 B1
(45) Date of Patent: Apr. 9, 2024

(54) SYSTEM, APPARATUS, AND METHOD FOR SUPPORTING SIGNAGE

(71) Applicant: Brett Robert Roe, Media, PA (US)

(72) Inventor: Brett Robert Roe, Media, PA (US)

( * ) Notice: Subject to any disclaimer, the term of this patent is extended or adjusted under 35 U.S.C. 154(b) by 0 days.

(21) Appl. No.: 18/507,982

(22) Filed: Nov. 13, 2023

(51) Int. Cl.
*G09F 7/22* (2006.01)
*G09F 7/18* (2006.01)

(52) U.S. Cl.
CPC ........ *G09F 7/22* (2013.01); *G09F 2007/1817* (2013.01)

(58) Field of Classification Search
CPC ...... G09F 7/18; G09F 7/22; G09F 2007/1817; E05D 3/12
USPC .............. 40/607.14, 607.13, 607.11, 607.12; 16/282, 368
See application file for complete search history.

(56) References Cited

U.S. PATENT DOCUMENTS

2010/0126051 A1* 5/2010 Kerton ...................... G09F 7/18 40/607.13
2020/0190881 A1* 6/2020 Wu ...................... E05F 1/1025

OTHER PUBLICATIONS

BannerSaver advertisement (4 pages); printed Nov. 13, 2023 from https://bannersaver.com/shop/bannersaver-set.

* cited by examiner

*Primary Examiner* — Cassandra Davis
(74) *Attorney, Agent, or Firm* — Gerben Perrott, PLLC

(57) ABSTRACT

An apparatus for supporting signage at a support structure is disclosed. The apparatus has a torsion member configured to be attached to the signage, at least one base member configured to be attached to the support structure, and at least one hinge assembly that is disposed between the torsion member and the at least one base member, the at least one hinge assembly including a base hinge subassembly and a second hinge subassembly that are attached together. The base hinge subassembly is attached to the at least one base member. The second hinge subassembly is attached to the torsion member. The torsion member is rotatable in a first rotational direction about the second hinge subassembly and a second rotational direction about the base hinge subassembly, the first rotational direction being different from the second rotational direction.

20 Claims, 10 Drawing Sheets

SYSTEM, APPARATUS, AND METHOD FOR SUPPORTING SIGNAGE

TECHNICAL FIELD

The present disclosure generally relates to a system, apparatus, and method for signage, and more particularly to a system, apparatus, and method for supporting signage.

BACKGROUND

Signage such as rigid and flexible signs are often attached to existing structures such as walls and poles. These signs are often projecting signs, which when attached to a structure often create a cantilever loading on that structure. Wind loading, when applied to the signage attached to a structure, can produce significant cantilevered loadings.

Because signage loadings can be significant, building codes often provide criteria to be met for supporting signage. This is at least partly in view of structural failures that have occurred in the past due to excessive signage loadings. Many existing structures are incapable of meeting code criteria such as wind loading criteria for signage using conventional signage attachment techniques.

Accordingly, a need in the art exists for signage attachment technology for reducing loading such as wind loading on support structures.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus for supporting signage at a support structure. The apparatus includes a torsion member configured to be attached to the signage, at least one base member configured to be attached to the support structure, and at least one hinge assembly that is disposed between the torsion member and the at least one base member, the at least one hinge assembly including a base hinge subassembly and a second hinge subassembly that are attached together. The base hinge subassembly is attached to the at least one base member. The second hinge subassembly is attached to the torsion member. The torsion member is rotatable in a first rotational direction about the second hinge subassembly and a second rotational direction about the base hinge subassembly, the first rotational direction being different from the second rotational direction.

In another aspect, the present disclosure is directed to a method. The method includes providing at least one hinge assembly including a base hinge subassembly and a second hinge subassembly that are attached together, attaching a torsion member to the second hinge subassembly, attaching at least one base member to a support structure, and attaching the base hinge subassembly to the at least one base member. The at least one hinge assembly is attached between the at least one base member and the torsion member. The torsion member is rotatable in a first rotational direction about the second hinge subassembly and a second rotational direction about the base hinge subassembly, the first rotational direction being different from the second rotational direction.

DETAILED DESCRIPTION AND INDUSTRIAL APPLICABILITY

Figure 1A:
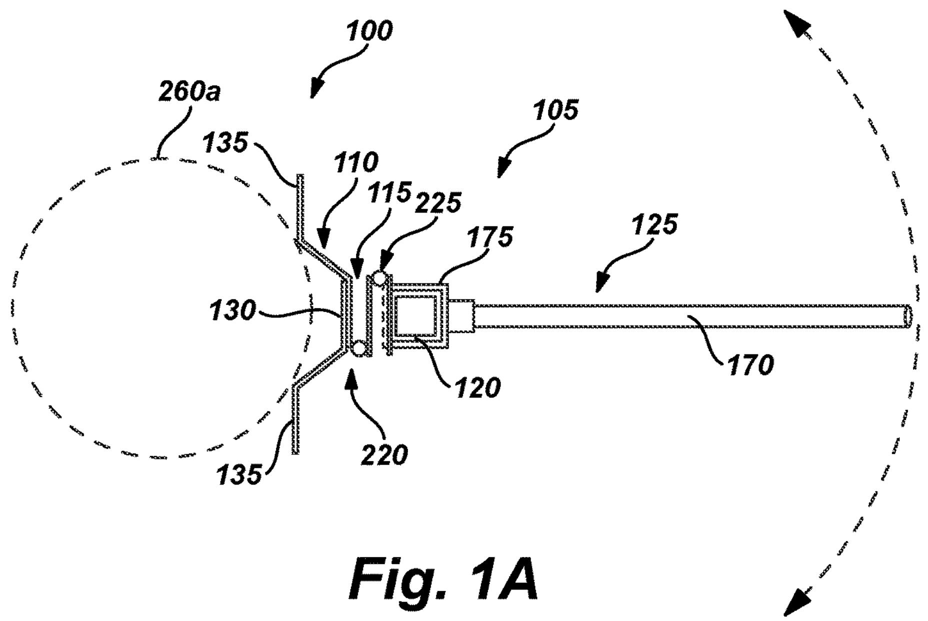
FIG. 1A is a schematic sectional view of an exemplary embodiment of the present invention.

The exemplary disclosed system, apparatus, and method may include an apparatus that may be attached to a support structure and that may support signage such as projecting or cantilevered signs. Projecting or cantilevered signs, due to their geometry, may result in significant wind loads being transferred to a support structure. The exemplary disclosed apparatus may operate to reduce an amount of wind loads transferred from the signage to the support structure.

FIGS. 1A through 6 illustrate an exemplary disclosed support system 100 that may include an apparatus 105. Apparatus 105 may include one or more (e.g., a plurality of) base members 110. Apparatus 105 may also include one or more (e.g., a plurality of) hinge assemblies 115, a torsion member 120, and a plurality of support members 125. Base members 110 may support hinge assemblies 115, which may in turn be attached to torsion member 120 to which support members 125 may be attached. In at least some exemplary embodiments, apparatus 105 may include one or more base members 110, one or more hinge assemblies 115, and one or more support members 125.

Base member 110 may be a plate such as a bent base plate. Base member 110 may be bent to form a protruding portion 130 that protrudes from base legs 135. Hinge assembly 115 may be attached to protruding portion 130 for example as described below. Base legs 135 may contact a surface of a support structure to which apparatus 105 may be attached for example as described below. Protruding portion 130 protruding from base legs 135 attached to the support structure surface may help to provide a range of motion (e.g., rotation) of signage supported by apparatus 105 for example as described below. Base member 110 may be formed from any suitable structural material such as, for example, metal, structural plastic, composite material, or any other suitable structural material. For example, base member 110 may be formed from aluminum or steel. In at least some exemplary embodiments, base member 110 may be a bent aluminum plate or a bent steel plate.

Figure 3:
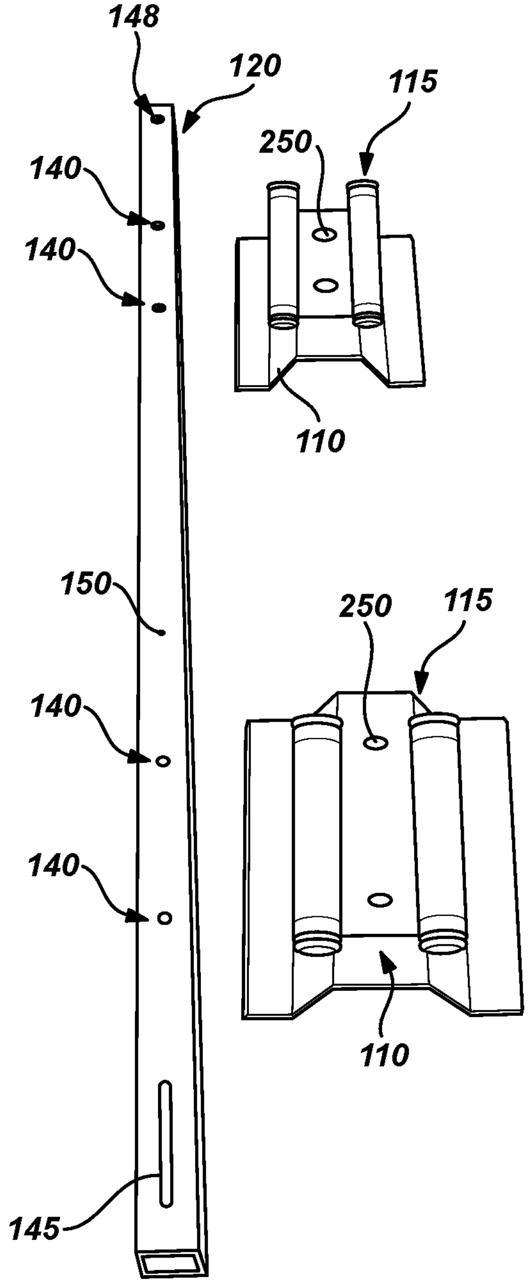
FIG. 3 is a perspective view of exemplary components of an exemplary embodiment of the present invention.
Figure 4:
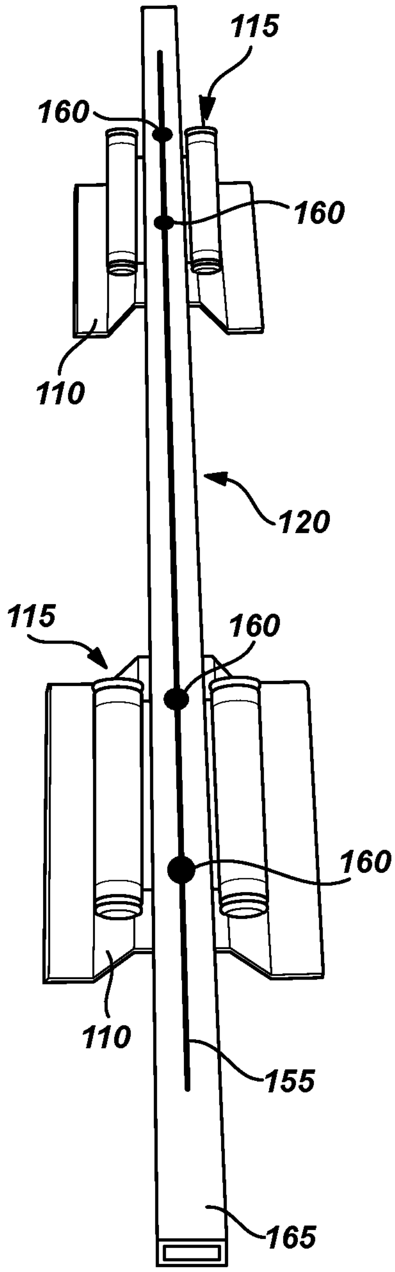
FIG. 4 is a perspective view of exemplary components of an exemplary embodiment of the present invention.

Torsion member 120 may be an elongated, hollow structural member. Torsion member 120 may be any suitable structural member for transferring forces (e.g., flexural, shear, and/or torsional forces) from the exemplary disclosed signage to hinge assemblies 115. In at least some exemplary embodiments, torsion member 120 may be a tube (e.g., a torsion tube). Torsion member 120 may be formed from material similar to base member 110 for example as described above. In at least some exemplary embodiments, torsion member 120 may be an aluminum hollow square tube. Torsion member 120 may include (e.g., may be machined to include) apertures (e.g., slots and holes) for attachment to hinge assemblies 115 and support members 125 as described below. For example as illustrated in FIG. 3, torsion member 120 may include a plurality of apertures 140, a support member slot 145, and a support member aperture 148 at a hinge face 150 configured to face hinge assemblies 115 when torsion member 120 is attached to hinge assemblies 115. Also for example as illustrated in FIG. 4, torsion member 120 may include an elongated slot 155 and a plurality of signage apertures 160 spaced along slot 155 at a signage face 165 disposed at an opposite side of torsion member 120 as hinge face 150.

Figure 2:
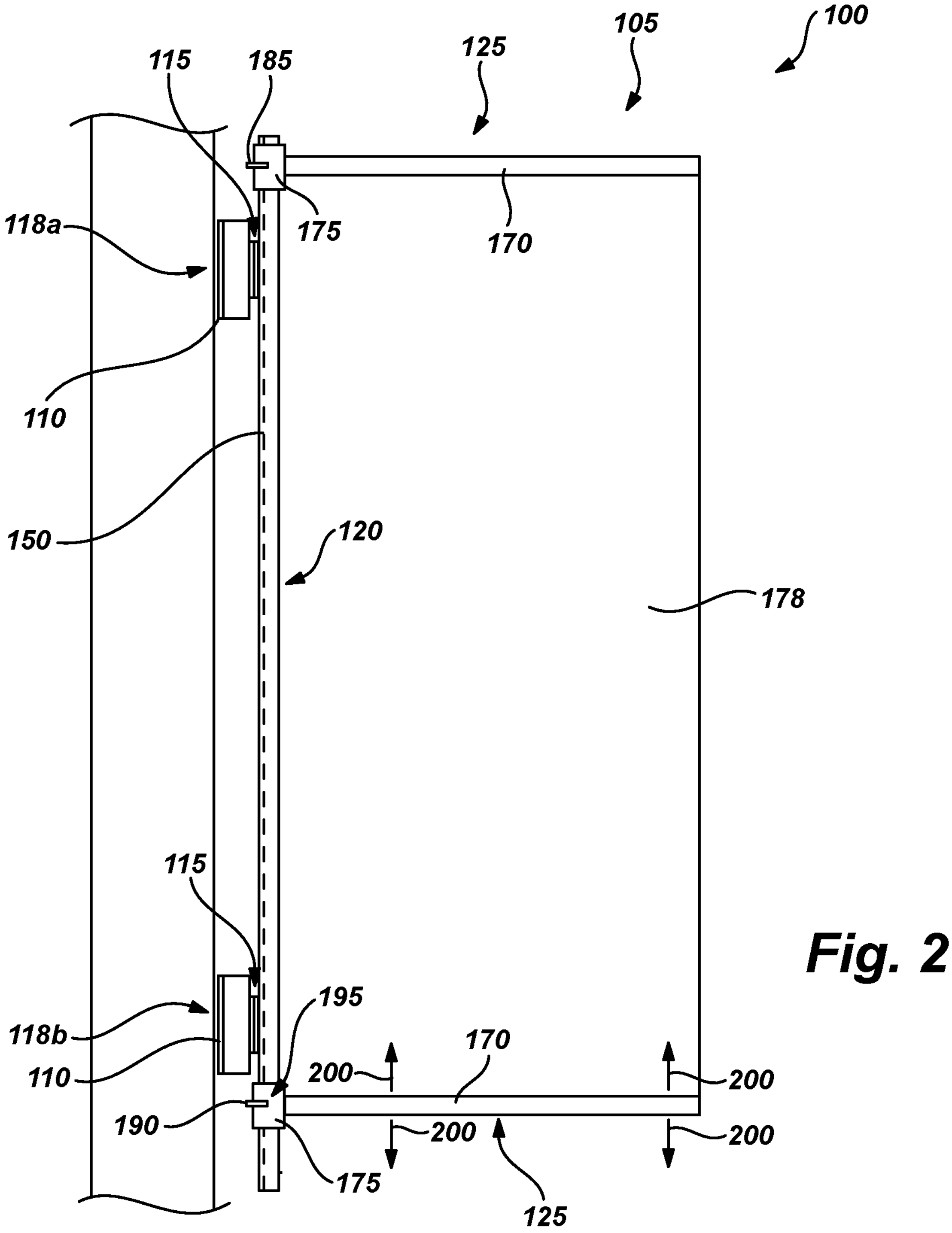
FIG. 2 is a side view of an exemplary embodiment of the present invention.
Figure 6:
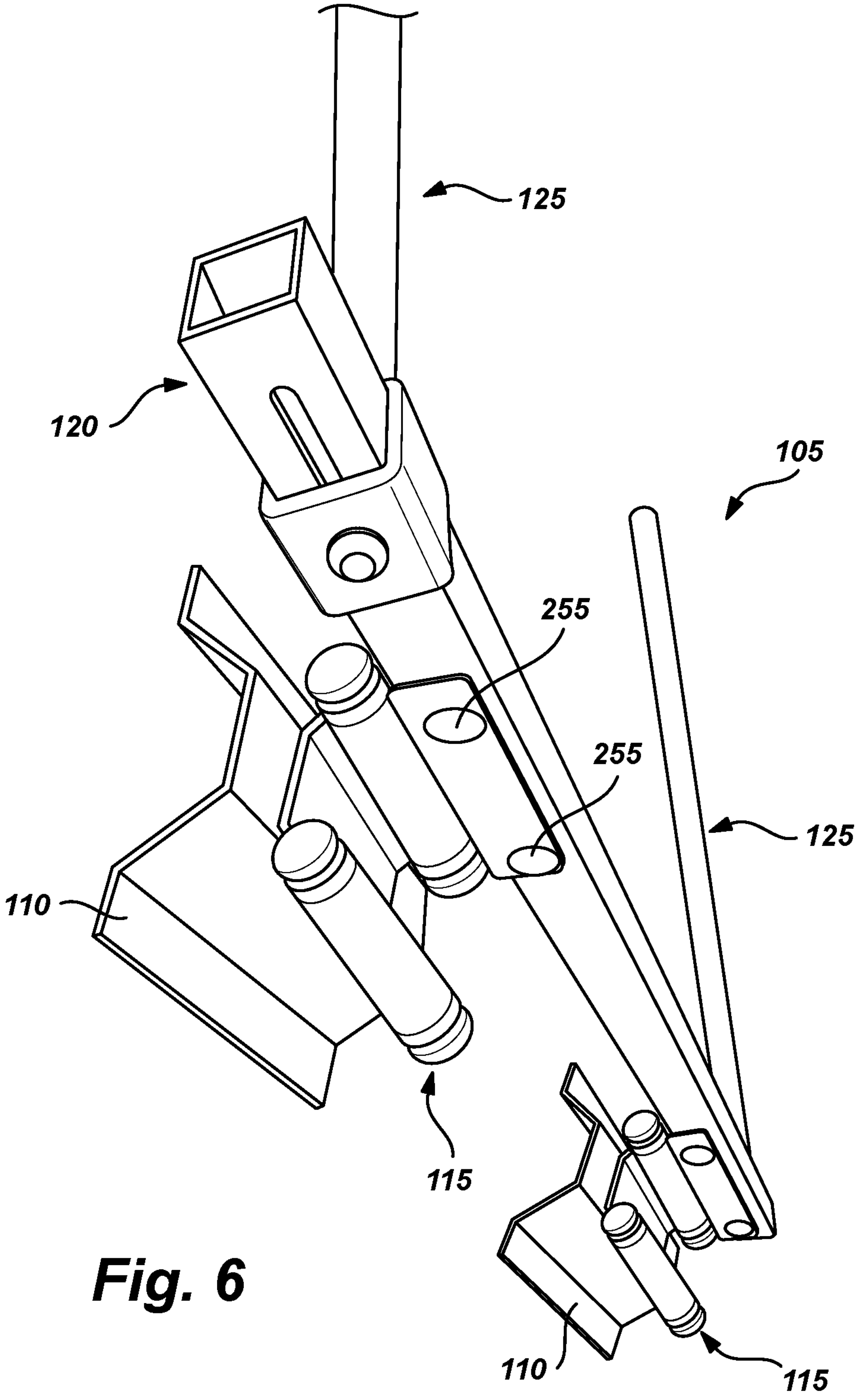
FIG. 6 is a perspective view of an exemplary embodiment of the present invention.

Support member 125 may be an elongated member that may be removably attached to torsion member 120 for mounting signage (e.g., flexible signage) as further described below. Support member 125 may include a signage portion 170 and a base portion 175. Signage portion 170 may be a solid member or a hollow member to which signage such as a flexible banner 178 may be attached and/or supported for example as illustrated in FIG. 2. Base portion 175 may be a bracket forming a torsion member aperture 180 for attachment to torsion member 120 based on torsion member 120 being received in base portion 175 (e.g., through torsion member aperture 180) for example as illustrated in FIGS. 2 and 6. Signage portion 170 and base portion 175 may be attached to each other via any suitable technique (e.g., welding) or may be integral parts of a support member 125. Support member 125 may be formed from material similar to base member 110 for example as described above.

Figure 5:
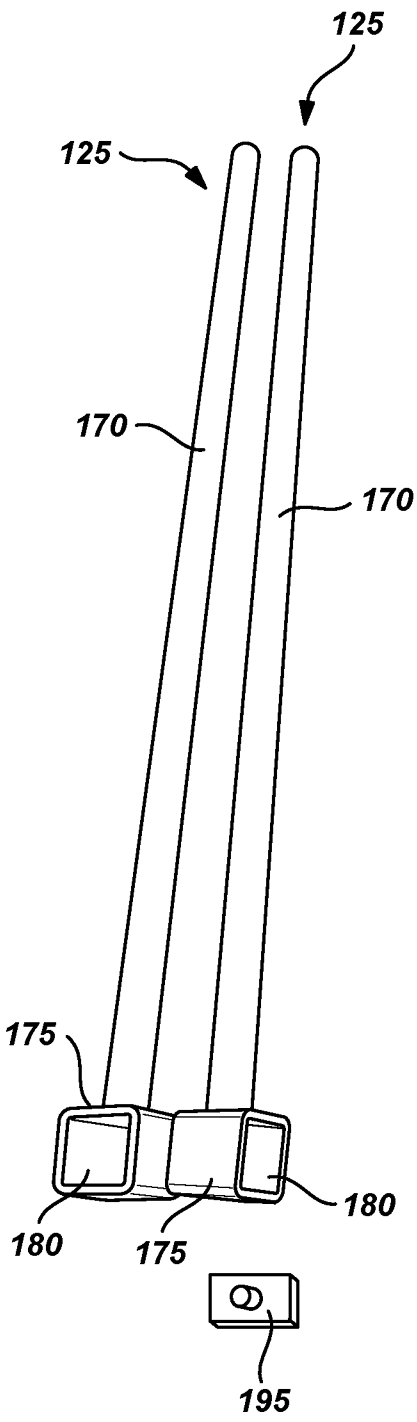
FIG. 5 is a perspective view of exemplary components of an exemplary embodiment of the present invention.

One or more support members 125 may be removably attached to torsion member 120. For example as illustrated in FIG. 2, an upper support member 125 may be removably attached to torsion member 120 based on an upper fastener 185 being received through support member aperture 148 and a similar aperture disposed at base portion 175 when torsion member 120 is received through torsion member aperture 180 of base portion 175 of upper support member 125. A lower support member 125 may also be removably attached to torsion member 120 based on a lower fastener 190 being received through support member slot 145 and a similar aperture disposed at base portion 175 when torsion member 120 is received through torsion member aperture 180 of base portion 175 of lower support member 125. An adjustable fastening component 195 for example as illustrated in FIG. 5 may also be received in support member slot 145 and/or may receive lower fastener 190 for facilitating adjustable fastening of lower support member 125 to torsion member 120 to adjust for varying length of flexible banner 178. For example, adjustable fastening component 195 may be movably adjusted along a length (e.g., part of a length) of support member slot 145 to fasten lower support member 125 at a desired location to correspond to a height of flexible banner 178. Any other suitable fastening technique may be used to provide for adjustable fastening of lower support member 125 along torsion member 120 such as, for example, mechanical fastening, hook and loop fasteners, adhesive, and or any other desired technique. For example, lower support member 125 may be adjustable by any desired amount to accommodate for different heights of different flexible banners 178 (e.g., as schematically illustrated in FIG. 2 by movement arrows 200) such as between about 1" and about 12", between about 2" and about 6", or between about 2" and about 4" (e.g., about 3"). One or more support members 125 may thereby be slidably adjustable along torsion member 120. Flexible banner 178 may be formed from any suitable flexible material such as, for example, vinyl, flexible fabric, cloth, and/or any other desired flexible material. Flexible banner 178 may be removably attached to support members 125 via any suitable technique such as, for example, mechanical fasteners (e.g., clips, hooks, button, zippers, and/or any other suitable fasteners), apertures (e.g., elongated apertures of flexible banner 178 configured to receive support members 125), adhesive, hook and loop fasteners, magnets, and/or any other suitable attachment technique.

Figure 7A:
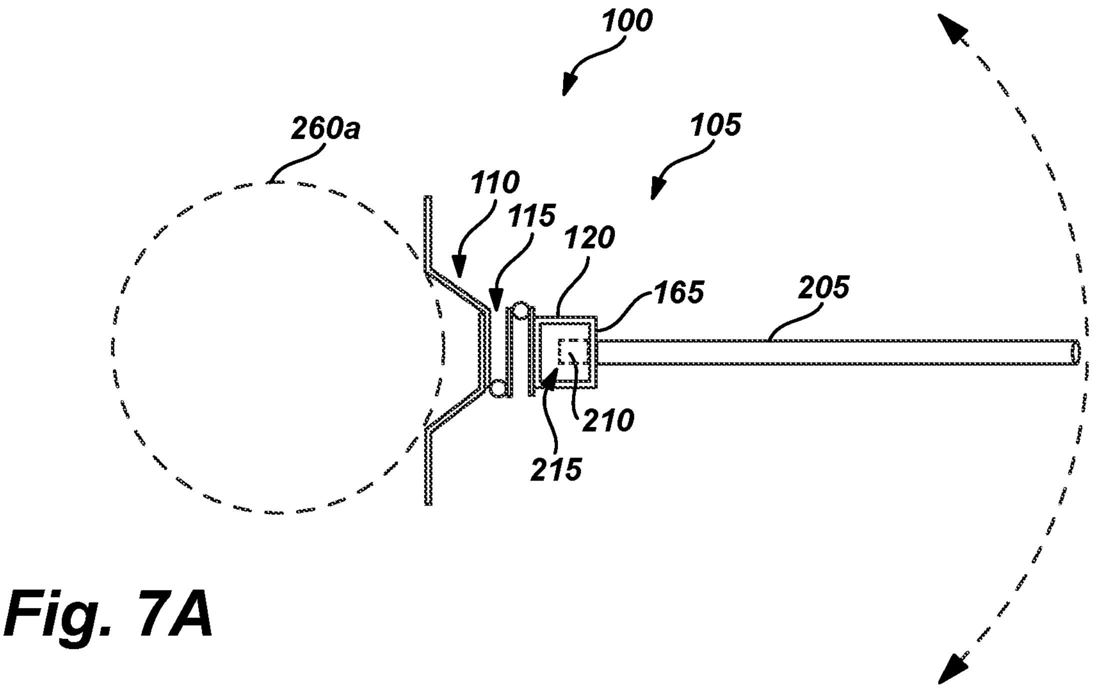
FIG. 7A is a schematic sectional view of an exemplary embodiment of the present invention.
Figure 7B:
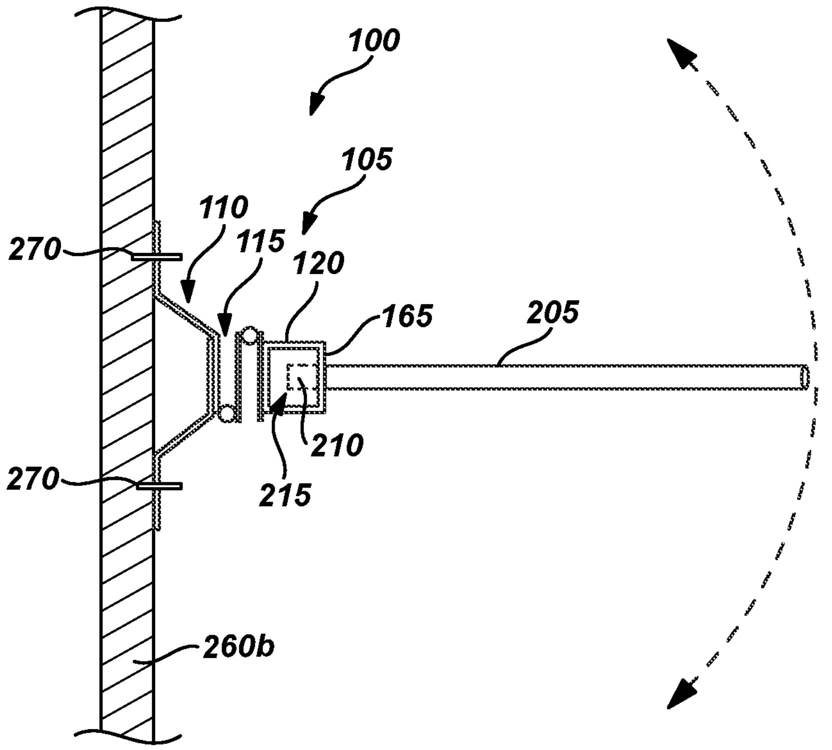
FIG. 7B is a schematic sectional view of an exemplary embodiment of the present invention.

In at least some exemplary embodiments and as illustrated in FIGS. 7A and 7B for when system 100 and apparatus 105 may be used to support rigid signage, support members 125 may be removed. For example, support members 125 may be removed from apparatus 105 (e.g., from torsion member 120) and a rigid panel 205 may be directly received and/or supported at torsion member 120. Received portions 210 of rigid panel 205 may be received through slot 155 and/or signage apertures 160 disposed at signage face 165 illustrated in FIG. 4. Returning to FIGS. 7A and 7B, received portions 210 received in a torsion cavity 215 of torsion member 120 may thereby fasten (e.g., anchor) rigid panel 205 directly to torsion member 120 (e.g., without attachment of support members 125 to torsion member 120).

One or more base members 110 may be used to attach one or more hinge assemblies 115 (e.g., and torsion member 120) to a support structure. For example as illustrated in FIG. 2, an upper and a lower base member 110 may be used to attach an upper and a lower hinge assembly 115 (e.g., and torsion member 120) to a support structure (e.g., for either flexible banner 178 or rigid panel 205). Upper base member 110 and upper hinge assembly 115 may together form an upper hinge support 118*a*. Lower base member 110 and lower hinge assembly 115 may together form a lower hinge support 118*b*. Torsion member 120 may transfer wind loading applied to attached signage as torsion forces (e.g., torsion member 120 may be stressed in torsion and may deform slightly via twisting when transferring torsion, and/or transfer flexural and and/or shear forces). In transferring torsion forces, torsion member 120 may serve to stabilize deformation of apparatus 105 between hinge assemblies 115 and base members 110 (e.g., between upper hinge support 118*a* and lower hinge support 118*b*). Hinge assemblies 115 may also move based on the wind loading to reduce forces transferred to the support structure to which base members 110 may be attached as further described below. Based on transfer of force through torsion (e.g., and/or flexural and/or shear forces) of torsion member 120, apparatus 105 may respond to wind loads as a unitary structure, which may reduce wind loading transferred (e.g., ultimately transferred) to the support structure via base members 110, as further described below.

Figure 1B:
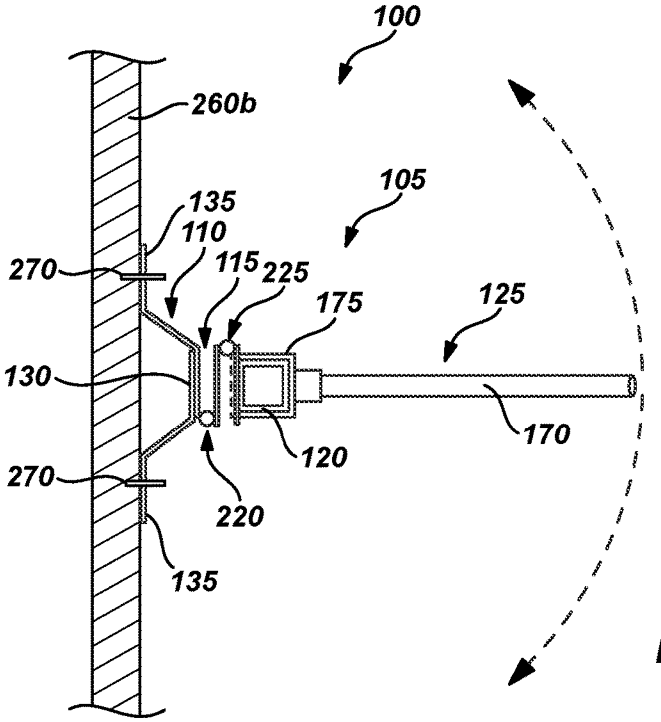
FIG. 1B is a schematic sectional view of an exemplary embodiment of the present invention.
Figure 1C:
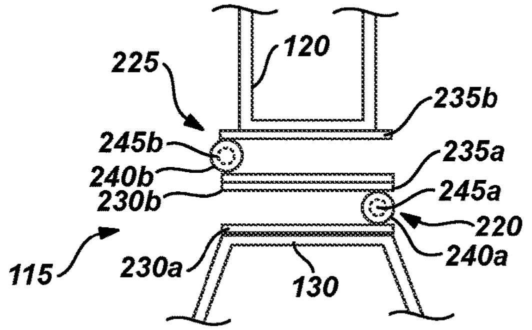
FIG. 1C is a detailed, schematic sectional view of an exemplary component of an exemplary embodiment of the present invention.

Returning to FIGS. 1A, 1B, and 1C, hinge assembly 115 may be a double hinge assembly. Hinge assembly 115 may be formed from material similar to base member 110 for example as described above. Hinge assembly 115 may include a first hinge subassembly (e.g., a base hinge subassembly 220) and a second hinge subassembly 225. Base hinge subassembly 220 and second hinge subassembly 225 may be similar to each other. As illustrated in FIG. 1C, base hinge subassembly 220 may include a bottom member 230*a* and a top member 235*a* that may be rotatably attached via a biasing housing 240*a*. Bottom member 230*a* and top member 235*a* may be plates formed from material similar to base member 110 (e.g., metal plates). Biasing housing 240*a* may include a biasing member 245*a*. Biasing member 245*a* may be disposed in (e.g., built into) biasing housing 240*a*. Biasing housing 240*a* and biasing member 245*a* may together form a biasing assembly that may be attached to each of bottom member 230*a* and top member 235*a* via any suitable technique such as, for example, mechanical fasteners (e.g., rotatable mechanical fasteners), welding, and/or any other suitable attachment technique.

Biasing member 245*a* may be any suitable member for deforming to store potential energy. For example, biasing member 245*a* may be any suitable member for deforming to store potential energy based on a rotation of top member 235*a* relative to bottom member 230*a* based on a wind loading applied to system 100 for example as described herein. Biasing member 245*a* may be a spring, an elastomeric member, or any other suitable biasing member. In at least some exemplary embodiments, biasing member 245*a* may be a metal spring (e.g., a stainless steel spring or a hardened steel spring) or a spring formed from any other suitable material for deforming to store potential energy. Biasing member 245*a* may be disposed longitudinally within biasing housing 240*a* (e.g., vertically relative to a ground surface on which system 100 may be supported). Second hinge subassembly 225 may include a bottom member 230*b*, a top member 235*b*, a biasing housing 240*b*, and a biasing member 245*b* that may be similar to bottom member 230*a*, top member 235*a*, biasing housing 240*a*, and biasing member 245*a*, respectively.

For example as illustrated in FIG. 1C, bottom member 230*a* may be attached to protruding portion 130, top member 235*a* may be attached to bottom member 230*b*, and top member 235*b* may be attached to torsion member 120 via any suitable attachment technique such as, for example, welding, mechanical fasteners, adhesive, and/or any other suitable technique. In at least some exemplary embodiments, top member 235*a* and bottom member 230*b* may be integral portions of a single member (e.g., may comprise a single member). Bottom member 230*a* may contact protruding portion 130, and hinge assembly 115 may be attached to protruding portion 130 of base member 110 via one or more base fasteners 250 (e.g., illustrated in FIG. 3) that may be received in apertures of bottom member 230*a* (e.g., and/or other components of hinge assembly 115) and protruding portion 130. Also for example as illustrated in FIGS. 3, 4, and 6, top member 235*b* may contact torsion member 120, and hinge assembly 115 may be attached to torsion member 120 via torsion member fasteners 255 that may be received in apertures 140 of torsion member 120 and similar apertures of top member 235*b* (e.g., and/or other components of hinge assembly 115). Base hinge subassembly 220 and second hinge subassembly 225 may be disposed with biasing housings 240*a* and 240*b* on opposite sides relative to each other as illustrated in FIGS. 1A through 1C, or in any other desired orientation relative to each other (e.g., based on expected directions of wind loading). Base hinge subassembly 220 and second hinge subassembly 225 may each be single biasing assemblies (e.g., single hinges such as single spring-tensioned hinges) that together may form hinge assembly 115 that may be a double hinge (e.g., a double spring-tensioned hinge including biasing members 245*a* and 245*b*). Hinge assembly 115 may thereby provide for rotation of apparatus 105 in multiple directions for example as described further below.

Figure 8:
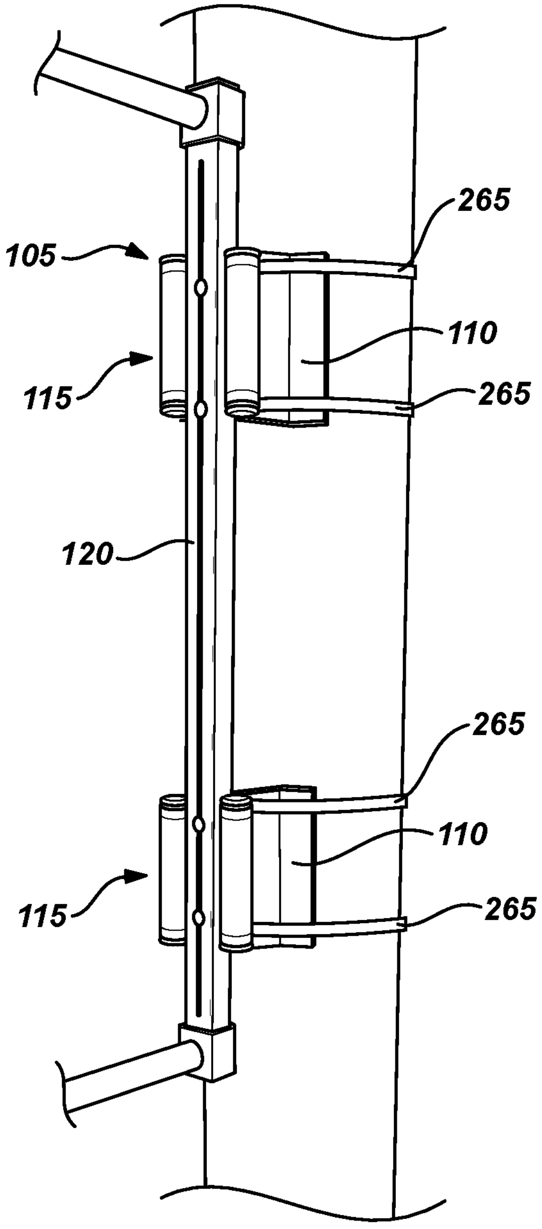
FIG. 8 is a perspective view of an exemplary embodiment of the present invention.

Apparatus 105 may be attached to any desired support structure such as, for example, a pole, a wall (e.g., of a building, a stadium or arena, a bridge, a storage structure, or any other suitable structure), a vehicle (e.g., a ground vehicle, a maritime vessel, or an aircraft), or any other suitable structure. For example as illustrated in FIGS. 1A and 7A, apparatus 105 may be attached to a support structure 260*a* that may be a pole such as a utility or lighting pole, a column, a post, or any other desired elongated structure. Also for example as illustrated in FIGS. 1B and 7B, apparatus 105 may be attached to a support structure 260*b* that may be a wall of any suitable structure (e.g., a wall of a building, arena, transportation structure such as a bridge, vehicle, vessel, and/or any other suitable structure). Apparatus 105 may be attached to support structure 260*a* or support structure 260*b* via any suitable technique such as, for example, via mechanical fasteners, adhesive, structural mounting (e.g., welding or structural anchoring), and/or any other suitable technique. For example, apparatus 105 may be attached to support structure 260*a* via mechanical fastening bands 265 (e.g., structural metal bands) as illustrated in FIG. 8. Also for example, apparatus 105 may be attached to support structure 260*b* via mechanical fasteners 270 (e.g., anchor bolts or screws) as illustrated in FIGS. 1B and 7B. As illustrated in FIGS. 1A, 1B, 7A, and 7B, apparatus 105 supporting either flexible signage or rigid signage may be attached to any suitable support structure (e.g., poles and/or walls) via the exemplary disclosed attachment techniques.

Figure 9:
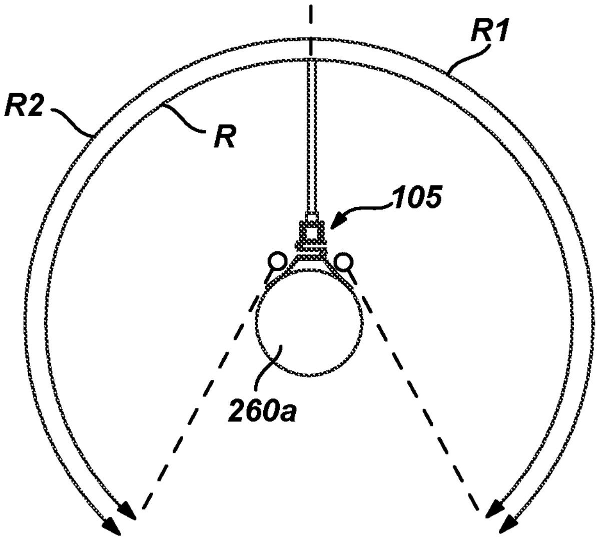
FIG. 9 is a schematic view of an exemplary embodiment of the present invention.

As illustrated in FIG. 9, apparatus 105 may allow for rotation in multiple directions about a support structure for example as further described below. For example when apparatus 105 is attached to support structure 260*a* such as a pole, apparatus 105 may provide for a rotational range R about support structure 260*a* such as, for example, up to 300 degrees (e.g., up to about 150 degrees under wind loads in either direction from an initial, at-rest position when apparatus 105 is not under wind loading for example as illustrated in FIG. 8). For example as illustrated in FIG. 9, wind loading may rotate apparatus 105 between up to 150 degrees in a first rotational direction R1 and up to 150 degrees in a second rotational direction R2 that may be different from (e.g., opposite to, such as reverse of) first rotational direction R1. Also for example when apparatus 105 is attached to support structure 260*b* such as a wall, apparatus 105 may provide for rotational range R of up to about 180 degrees between the faces of support structure 260*b* on each side of apparatus 105 (e.g., or less or more depending for example on the geometry of the wall).

The exemplary disclosed system, apparatus, and method may be used in any suitable application for supporting a load on a structure. For example, the exemplary disclosed system, apparatus, and method may be used in any suitable application for supporting signage on a support structure. The exemplary disclosed system, apparatus, and method may be used in any suitable application for supporting a cantilevered load on a structure.

Figure 10A:
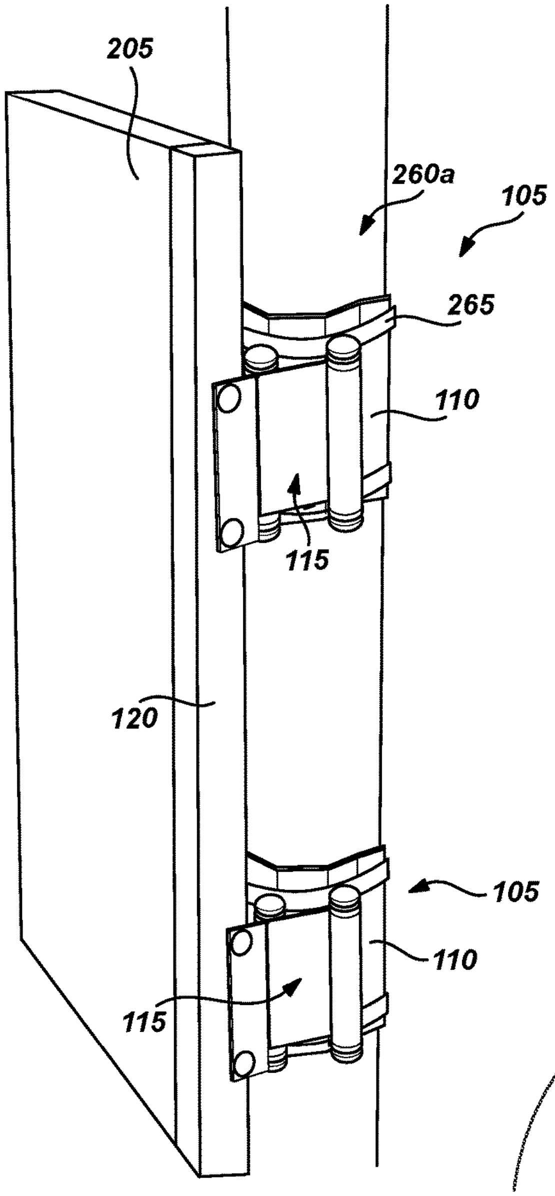
FIG. 10A is a perspective view of an exemplary embodiment of the present invention.
Figure 10B:
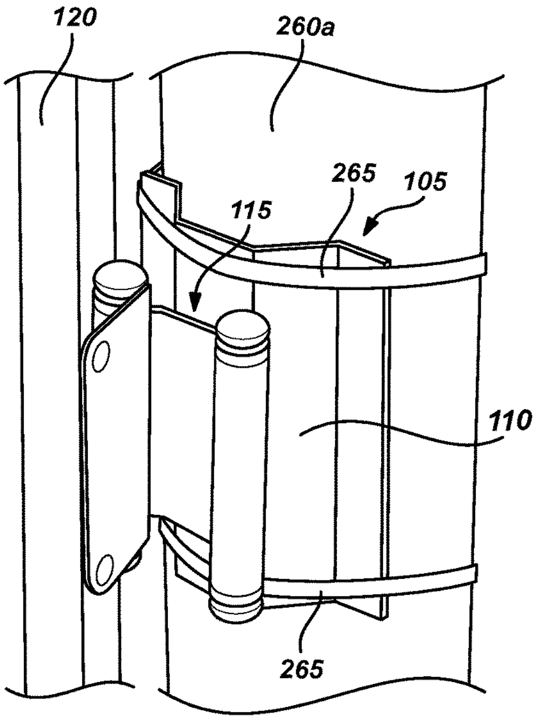
FIG. 10B is a perspective view of an exemplary embodiment of the present invention.

FIGS. 10A through 11C illustrate an exemplary movement of apparatus 105 under loading such as, for example, wind loading or any other suitable loading (e.g., any physical force applied to signage supported by apparatus 105). As illustrated in FIGS. 10A through 10C, a first wind force W1 (e.g., a wind pressure) may be applied to rigid panel 205 (e.g., or flexible banner 178), which may for example cause apparatus 105 to move in first rotational direction R1 as illustrated in FIG. 9. Returning to FIGS. 10A through 10C, first wind force W1 may cause apparatus 105 to move in first rotational direction R1 so that top member 235*b* rotates relative to bottom member 230*b* of second hinge subassembly 225 at each hinge assembly 115 of apparatus 105 (e.g., at both upper hinge support 118*a* and lower hinge support 118*b* for example as illustrated in FIG. 2). Returning to FIG. 10C, signage (e.g., flexible banner 178 or rigid panel 205), torsion member 120, and each top member 235*b* may rotate under first wind force W1. As top member 235*b* rotates relative to bottom member 230*b*, biasing member 245*b* may be deformed to store potential energy, which may help to reduce the force transferred by hinge assemblies 115 to the support structure (e.g., support structure 260*a* or 260*b*) via base members 110 based on first wind force W1 being used to deform biasing member 245*b* of each hinge assembly 115 (e.g., instead of being transferred to support structure 260*a* or 260*b*). When first wind force W1 is reduced or removed, potential energy may be released from biasing member 245*b*, which may rotate top member 235*b* relative to bottom member 230*b* in a reverse direction from first rotational direction R1, which may move the exemplary disclosed signage toward (e.g., or to) the at-rest position (e.g., as illustrated in FIG. 1A, 1B, 7A, or 7B).

The exemplary movement described above regarding FIGS. 10A through 10C may occur at a plurality of hinge assemblies 115 of apparatus 105 for example as illustrated in FIG. 2. Because torsion member 120 may be attached between hinge assemblies 115, torsion member 120 may transfer forces (e.g., torsion, flexural, and/or shear forces) between hinge assemblies 115 to maintain a uniform overall rotation of the exemplary disclosed signage (e.g., flexible banner 178 or rigid panel 205) about hinge assemblies 115. For example in transferring forces (e.g., torsion, flexural, and/or shear forces) between hinge assemblies 115, torsion member 120 may help apparatus 105 to respond to wind loads (e.g., first wind force W1) as a unitary structure, including deforming and/or rotating as a unitary structure. This may help to transfer wind load to substantially uniformly deform (e.g., more efficiently deform) biasing members 245*b* of respective hinge assemblies 115, which may help to further reduce wind loading transferred to the exemplary disclosed support structure.

Figure 11A:
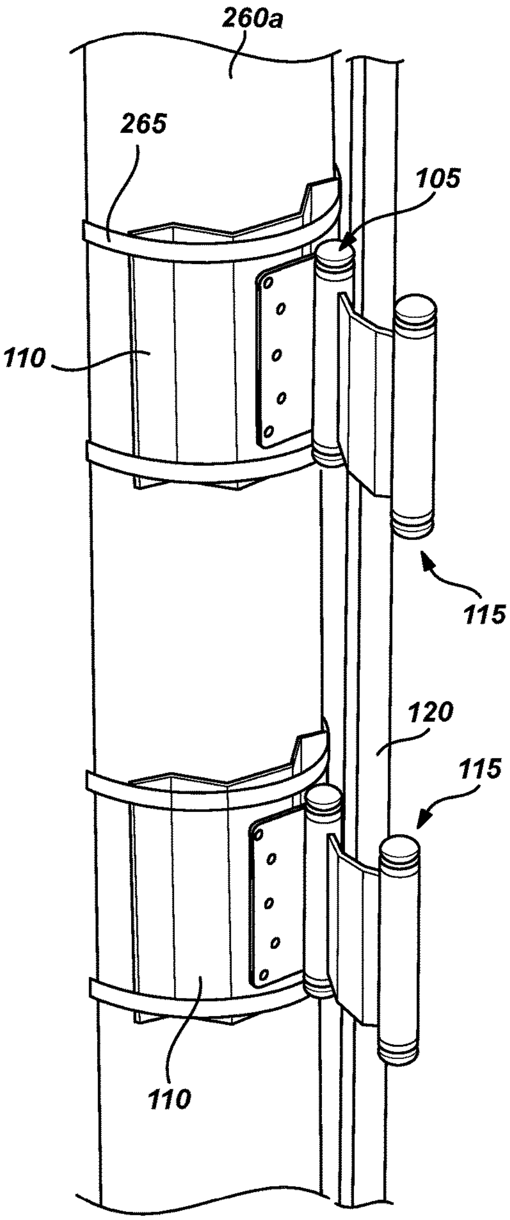
FIG. 11A is a perspective view of an exemplary embodiment of the present invention.
Figure 11B:
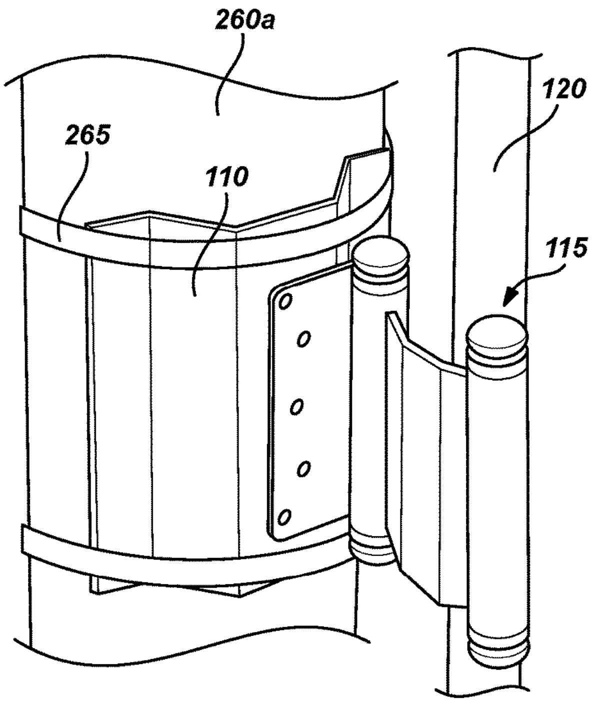
FIG. 11B is a perspective view of an exemplary embodiment of the present invention.
Figure 11C:
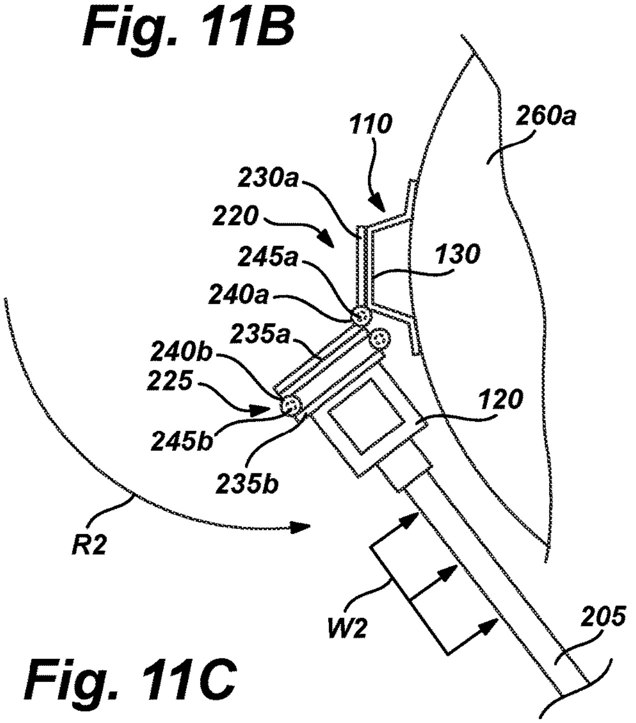
FIG. 11C is a schematic sectional view of an exemplary embodiment of the present invention.

As illustrated in FIGS. 11A through 11C, a second wind force W2 (e.g., a wind pressure) may be applied to rigid panel 205 (e.g., or flexible banner 178), which may for example cause apparatus 105 to move in second rotational direction R2 as illustrated in FIG. 9. Returning to FIGS. 11A through 11C, second wind force W2 may cause apparatus 105 to move in second rotational direction R2 so that top member 235*a* rotates relative to bottom member 230*a* of base hinge subassembly 220 at each hinge assembly 115 of apparatus 105 (e.g., at both upper hinge support 118*a* and lower hinge support 118*b* for example as illustrated in FIG. 2). Returning to FIG. 11C, signage (e.g., flexible banner 178 or rigid panel 205), torsion member 120, each second hinge subassembly 225, and each top member 235*a* may rotate under second wind force W2. As top member 235*a* rotates relative to bottom member 230*a*, biasing member 245*a* may be deformed to store potential energy, which may help to reduce the force transferred by hinge assemblies 115 to the support structure (e.g., support structure 260*a* or 260*b*) via base members 110 based on second wind force W2 being used to deform biasing member 245*a* of each hinge assembly 115 (e.g., instead of being transferred to support structure 260*a* or 260*b*). When second wind force W2 is reduced or removed, potential energy may be released from biasing member 245*a*, which may rotate top member 235*a* relative to bottom member 230*a* in a reverse direction from second rotational direction R2, which may move the exemplary disclosed signage toward (e.g., or to) the at-rest position (e.g., as illustrated in FIG. 1A, 1B, 7A, or 7B).

The exemplary movement described above regarding FIGS. 11A through 11C may occur at a plurality of hinge assemblies 115 of apparatus 105 for example as illustrated in FIG. 2, similar to as described above regarding FIGS. 10A through 10C. For example in transferring forces (e.g., torsion, flexural, and/or shear forces) between hinge assemblies 115, torsion member 120 may help apparatus 105 to respond to wind loads (e.g., second wind force W2) as a unitary structure, including deforming and/or rotating as a unitary structure. This may help to transfer wind load to substantially uniformly deform (e.g., more efficiently deform) biasing members 245*a* of respective hinge assemblies 115, which may help to further reduce wind loading transferred to the exemplary disclosed support structure.

Figure 10C:
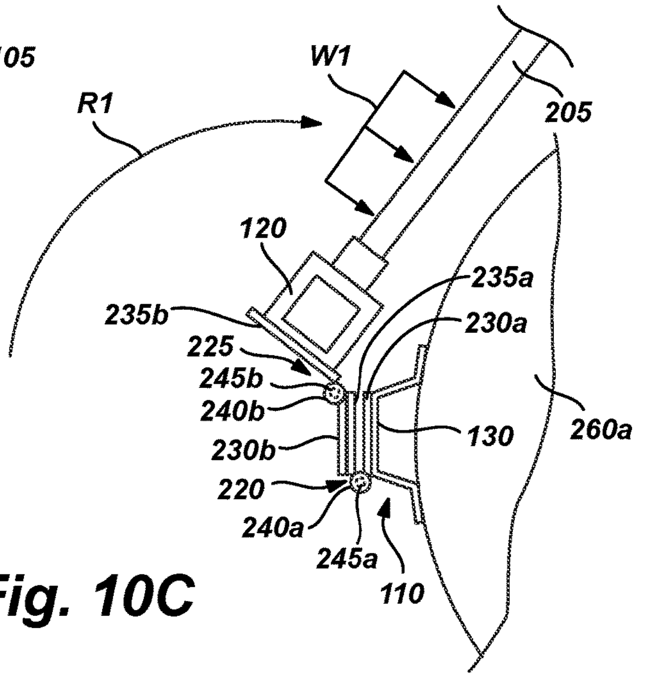
FIG. 10C is a schematic sectional view of an exemplary embodiment of the present invention.

Depending on which direction apparatus 105 is moved (e.g., first rotational direction R1 under first wind force W1, or second rotational direction R2 under second wind force W2), base hinge subassembly 220 and/or second hinge subassembly 225 may open, close, and/or be rotated with torsion member 120 and the exemplary disclosed signage. For example when apparatus 105 moves in first rotational direction R1 as illustrated in FIG. 10C, second hinge subassembly 225 may open so that biasing member 245*b* deforms to store potential energy, while base hinge subassembly 220 may remain closed and may remain stationary (e.g., not rotate) relative to (e.g., away from) base member 110. Also for example when apparatus 105 moves in second rotational direction R2 as illustrated in FIG. 11C, base hinge subassembly 220 may open so that biasing member 245*a* deforms to store potential energy, while second hinge subassembly 225 may remain closed and may rotate away from base member 110 along with torsion member 120 and the exemplary disclosed signage. Based on one of base hinge subassembly 220 and second hinge subassembly 225 opening and the other remaining closed (e.g., while either remaining stationary or rotating relative to base member 110), apparatus 105 may rotate in a plurality of directions (e.g., first rotational direction R1 or second rotational direction R2 that may be opposite to first rotational direction R1) with an exemplary disclosed biasing member storing potential energy to reduce wind loading transferred to the exemplary disclosed support structure and then releasing that potential energy to return apparatus 105 to the exemplary disclosed at-rest position when loading (e.g., wind loading) is no longer applied to system 100.

Figure 12:
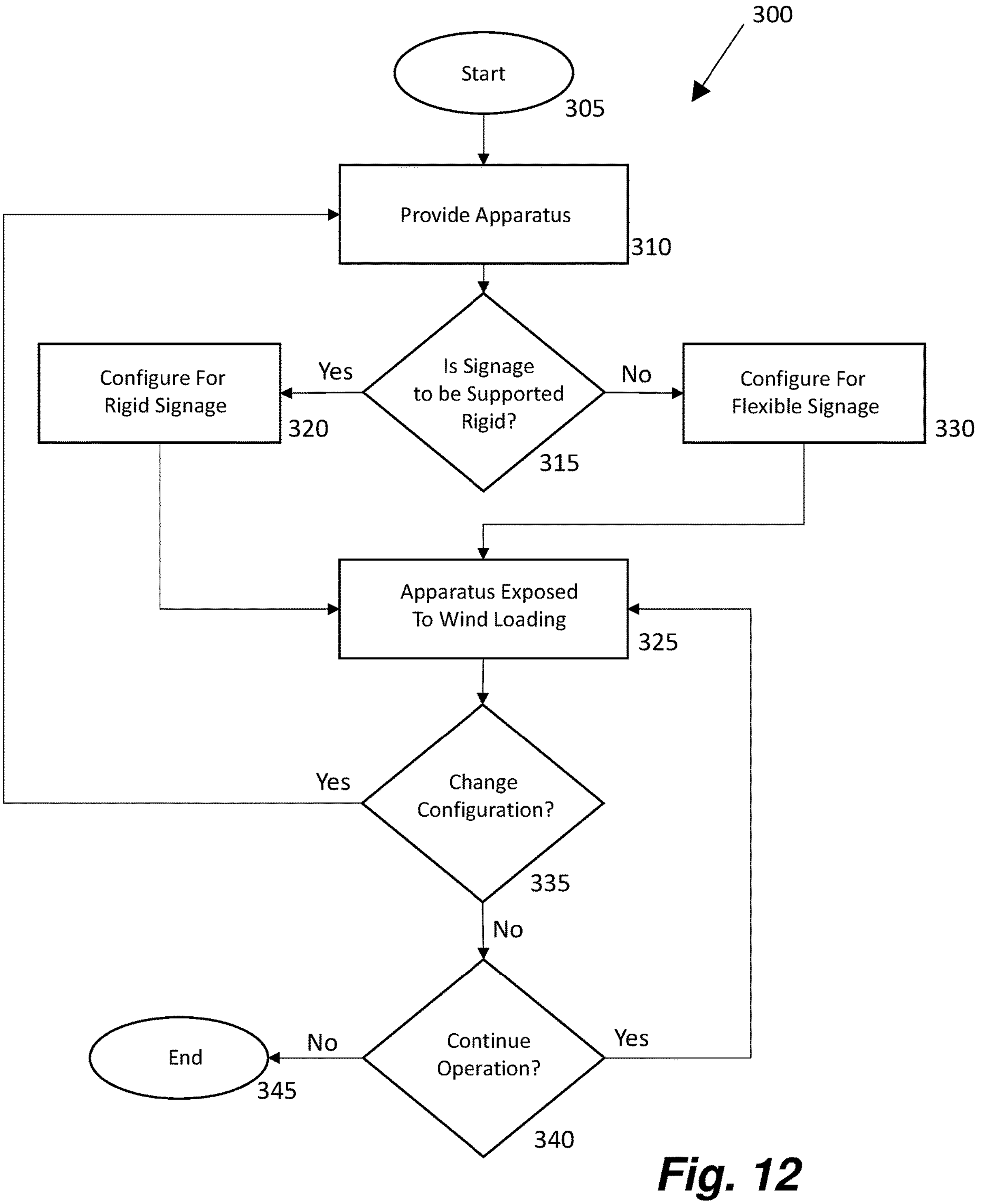
FIG. 12 illustrates an exemplary process of using at least some exemplary embodiments of the present disclosure.

FIG. 12 illustrates an exemplary process of using apparatus 105. Process 300 begins at step 305. At step 310, apparatus 105 may be provided and attached to support structure 260*a* or 260*b* (e.g., or alternatively attached to support structure 260*a* or 260*b* following steps 320 or 330 below). At step 315, it may be determined whether or not signage to be supported by apparatus 105 is to be rigid. If it is determined that signage to be supported by apparatus 105 is to be rigid, then process 300 may proceed to step 320.

At step 320, apparatus 105 may be configured for rigid signage (e.g., rigid panel 205). For example, apparatus 105 may be configured as illustrated in FIGS. 7A and 7B. For example as described above, rigid panel 205 may be received directly in torsion member 120, without attachment of support members 125. If support members 125 were previously attached to torsion member 120, then support members 125 may be detached at step 320 while apparatus 105 is configured for rigid signage.

If it is determined that signage to be supported by apparatus 105 is not to be rigid, then process 300 may proceed to step 330. At step 330, apparatus 105 may be configured for flexible signage (e.g., flexible banner 178). Support members 125 may be attached to torsion member 120 for example as described above. For example, apparatus 105 may be configured as illustrated in FIGS. 1A and 1B. Flexible banner 178 may thereby be supported by support members 125 attached to torsion member 120.

Following step 320 or step 330, process 300 may proceed to step 325. At step 325, apparatus 105 may be exposed to wind loading. For example, apparatus 105 may operate as described above regarding FIGS. 9 through 11C. Apparatus 105 may be exposed to wind loading for any desired amount of time while in the configuration determined at step 315. Process 300 may then proceed to step 335.

At step 335, it may be determined whether or not to change a configuration of apparatus 105. If the configuration of apparatus 105 is to be changed, process 300 may return to step 310. If the configuration of apparatus 105 is not to be changed, process 300 may proceed to step 340. At step 340, it may be determined whether or not to continue operation of system 100. If operation is to be continued, process 300 may return to step 325. Steps 310 through 340 may be repeated for as many iterations as desired. If it is determined at step 340 that operation of system 100 is not to be continued, then process 300 ends at step 345.

In at least some exemplary embodiments, apparatus 105 may be configured to support both hard and soft signage using the same attachment and mounting system. Apparatus 105 may be adjusted to accommodate different sizes (e.g., different height and/or width) of both hard and soft signage. Apparatus 105 may operate to rotate up to 300 degrees under wind loads for both hard and soft signage. Apparatus 105 may lower an amount of wind loading transferred from supported signage to support structures (e.g., poles or walls) to under 20 pounds at wind speeds of up to 90 MPH (e.g., between about 20 MPH and about 90 MPH). In at least some exemplary embodiments, apparatus 105 may lower an amount of wind loading transferred from supported signage to support structures to under 10 pounds from winds from all directions relative to system 100.

In at least some exemplary embodiments, the exemplary disclosed apparatus may be for supporting signage at a support structure. The apparatus may include a torsion member (e.g., torsion member 120) configured to be attached to the signage, at least one base member (e.g., base member 110) configured to be attached to the support structure, and at least one hinge assembly (e.g., hinge assembly 115) that is disposed between the torsion member and the at least one base member, the at least one hinge assembly including a base hinge subassembly and a second hinge subassembly that are attached together. The base hinge subassembly may be attached to the at least one base member. The second hinge subassembly may be attached to the torsion member. The torsion member may be rotatable in a first rotational direction about the second hinge subassembly and a second rotational direction about the base hinge subassembly, the first rotational direction being different from the second rotational direction. The first rotational direction may be opposite to the second rotational direction. A first hinge of the base hinge subassembly may be disposed at an opposite end of the at least one hinge assembly as a second hinge of the second hinge subassembly. The base hinge subassembly may include a first bottom member and a first top member rotatably attached to each other via a first biasing housing, and the second hinge subassembly may include a second bottom member and a second top member rotatably attached to each other via a second biasing housing. The first bottom member of the base hinge subassembly may be attached to the at least one base member, the first top member of the base hinge subassembly may be attached to the second bottom member of the second hinge subassembly, and the second top member of the second hinge subassembly may be attached to the torsion member. When the torsion member rotates in the first rotational direction about the second hinge subassembly, the torsion member and the second top member may rotate relative to the at least one base member about the second biasing housing of the second hinge subassembly, and the first bottom member and the first top member of the base hinge subassembly and the second bottom member of the second hinge subassembly may remain stationary relative to the at least one base member. When the torsion member rotates in the second rotational direction about the base hinge subassembly, the torsion member, the second top member and the second bottom member of the second hinge subassembly, and the first top member of the base hinge subassembly may rotate relative to the at least one base member about the first biasing housing of the base hinge subassembly, and the first bottom member of the base hinge subassembly may remain stationary relative to the at least one base member. When the torsion member rotates in the first rotational direction, then the torsion member and the second top member may rotate relative to the at least one base member about the second biasing housing of the second hinge subassembly. When the torsion member rotates in the second rotational direction, then the torsion member, the second top member, the second bottom member, and the first top member may rotate relative to the at least one base member about the first biasing housing of the base hinge subassembly. A first spring may be disposed in the first biasing housing of the base hinge subassembly, the first spring configured to deform to store potential energy when the torsion member rotates in the second rotational direction. A second spring may be disposed in the second biasing housing of the second hinge subassembly, the second spring configured to deform to store potential energy when the torsion member rotates in the first rotational direction. The torsion member may be rotatable 150 degrees in each of the first and second rotational directions. The exemplary disclosed apparatus may also include at least one support member that may be removably attachable to the torsion member and configured to receive the signage that may be flexible signage. The torsion member may include at least one of slots or apertures configured to receive signage that may be rigid signage.

In at least some exemplary embodiments, the exemplary disclosed method may include providing at least one hinge assembly (e.g., hinge assembly 115) including a base hinge subassembly and a second hinge subassembly that are attached together, attaching a torsion member (e.g., torsion member 120) to the second hinge subassembly, attaching at least one base member (e.g., base member 110) to a support structure, and attaching the base hinge subassembly to the at least one base member. The at least one hinge assembly may be attached between the at least one base member and the torsion member. The torsion member may be rotatable in a first rotational direction about the second hinge subassembly and a second rotational direction about the base hinge subassembly, the first rotational direction being different from the second rotational direction. The first rotational direction may be opposite to the second rotational direction. A first spring that may be disposed in the base hinge subassembly may be configured to deform to store potential energy when the torsion member rotates in the second rotational direction. A second spring that may be disposed in the second hinge subassembly may be configured to deform to store potential energy when the torsion member rotates in the first rotational direction. The torsion member may be rotatable 300 degrees about the at least one hinge assembly.

In at least some exemplary embodiments, the exemplary disclosed apparatus may be for supporting signage at a support structure. The exemplary disclosed apparatus may include a torsion member (e.g., torsion member 120) configured to be attached to the signage, an upper base member (e.g., base member 110 at upper hinge support 118*a*) and a lower base member (e.g., base member 110 at lower hinge support 118*b*) that may be configured to be attached to the support structure, an upper hinge assembly (e.g., hinge assembly 115 at upper hinge support 118*a*) that may be disposed between the torsion member and the first base member, the upper hinge assembly including an upper base hinge subassembly and an upper second hinge subassembly that are attached together, and a lower hinge assembly (e.g., hinge assembly 115 at lower hinge support 118*b*) that may be disposed between the torsion member and the second base member, the lower hinge assembly including a lower base hinge subassembly and a lower second hinge subassembly that are attached together. The upper base hinge subassembly of the upper hinge assembly may be attached to the upper base member. The lower base hinge subassembly of the lower hinge assembly may be attached to the lower base member. The upper and lower second hinge subassemblies may be attached to the torsion member. The torsion member may be rotatable in a first rotational direction about the upper and lower second hinge subassemblies. The torsion member may be rotatable in a second rotational direction about the upper and lower base hinge subassemblies. The first rotational direction may be opposite to the second rotational direction. The torsion member may be configured to transfer torsional forces between the upper hinge assembly and the lower hinge assembly. The exemplary disclosed method may also include a plurality of support members that may be removably attachable to the torsion member and configured to receive the signage that may be flexible signage, at least one of the plurality of support members being slidably adjustable along the torsion member. The torsion member may include at least one of slots or apertures configured to receive signage that may be rigid signage when the plurality of support members are detached from the torsion member.

In at least some exemplary embodiments, the exemplary disclosed system, apparatus, and method may provide an efficient and effective system for reducing loadings on support structures from signage attached to the support structures. For example, the exemplary disclosed system, apparatus, and method may be used to support both hard and soft signage. Also for example, the exemplary disclosed system, apparatus, and method may significantly reduce loading on a support structure caused by wind loading on signage attached to that support structure.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus for supporting signage at a support structure, comprising:

a torsion member configured to be attached to the signage;

at least one base member configured to be attached to the support structure; and at least one hinge assembly that is disposed between the torsion member and the at least one base member, the at least one hinge assembly including a base hinge subassembly and a second hinge subassembly that are attached together;

wherein the base hinge subassembly is attached to the at least one base member;

wherein the second hinge subassembly is attached to the torsion member;

wherein the torsion member is rotatable in a first rotational direction about the second hinge subassembly and a second rotational direction about the base hinge subassembly, the first rotational direction being different from the second rotational direction; and wherein the base hinge subassembly includes a first bottom member and a first top member rotatably attached to each other via a first biasing housing, and the second hinge subassembly includes a second bottom member and a second top member rotatably attached to each other via a second biasing housing.

2. The apparatus of claim 1, wherein the first rotational direction is opposite to the second rotational direction.

3. The apparatus of claim 1, wherein a first hinge of the base hinge subassembly is disposed at an opposite end of the at least one hinge assembly as a second hinge of the second hinge subassembly.

4. The apparatus of claim 1, wherein the first bottom member of the base hinge subassembly is attached to the at least one base member, the first top member of the base hinge subassembly is attached to the second bottom member of the second hinge subassembly, and the second top member of the second hinge subassembly is attached to the torsion member.

5. The apparatus of claim 1, wherein when the torsion member rotates in the first rotational direction about the second hinge subassembly:

the torsion member and the second top member rotate relative to the at least one base member about the second biasing housing of the second hinge subassembly; and the first bottom member and the first top member of the base hinge subassembly and the second bottom member of the second hinge subassembly remain stationary relative to the at least one base member.

6. The apparatus of claim 1, wherein when the torsion member rotates in the second rotational direction about the base hinge subassembly:

the torsion member, the second top member and the second bottom member of the second hinge subassembly, and the first top member of the base hinge subassembly rotate relative to the at least one base member about the first biasing housing of the base hinge subassembly; and the first bottom member of the base hinge subassembly remains stationary relative to the at least one base member.

7. The apparatus of claim 1, wherein:

when the torsion member rotates in the first rotational direction, then the torsion member and the second top member rotate relative to the at least one base member about the second biasing housing of the second hinge subassembly; and when the torsion member rotates in the second rotational direction, then the torsion member, the second top member, the second bottom member, and the first top member rotate relative to the at least one base member about the first biasing housing of the base hinge subassembly.

8. The apparatus of claim 1, wherein:

a first spring is disposed in the first biasing housing of the base hinge subassembly, the first spring configured to deform to store potential energy when the torsion member rotates in the second rotational direction; and a second spring is disposed in the second biasing housing of the second hinge subassembly, the second spring configured to deform to store potential energy when the torsion member rotates in the first rotational direction.

9. The apparatus of claim 1, wherein the torsion member is rotatable 150 degrees in each of the first and second rotational directions.

10. The apparatus of claim 1, further comprising at least one support member that is removably attachable to the torsion member and configured to receive the signage that is flexible signage.

11. The apparatus of claim 1, wherein the torsion member includes at least one of slots or apertures configured to receive signage that is rigid signage.

12. An apparatus for supporting signage at a support structure, comprising:

a torsion member configured to be attached to the signage;

an upper base member and a lower base member that are configured to be attached to the support structure;

an upper hinge assembly that is disposed between the torsion member and the first base member, the upper hinge assembly including an upper base hinge subassembly and an upper second hinge subassembly that are attached together; and a lower hinge assembly that is disposed between the torsion member and the second base member, the lower hinge assembly including a lower base hinge subassembly and a lower second hinge subassembly that are attached together;

wherein the upper base hinge subassembly of the upper hinge assembly is attached to the upper base member;

wherein the lower base hinge subassembly of the lower hinge assembly is attached to the lower base member;

wherein the upper and lower second hinge subassemblies are attached to the torsion member;

wherein the torsion member is rotatable in a first rotational direction about the upper and lower second hinge subassemblies;

wherein the torsion member is rotatable in a second rotational direction about the upper and lower base hinge subassemblies; and wherein the first rotational direction is opposite to the second rotational direction.

13. The apparatus of claim 12, wherein the torsion member is configured to transfer torsional forces between the upper hinge assembly and the lower hinge assembly.

14. The apparatus of claim 12, further comprising a plurality of support members that are removably attachable to the torsion member and configured to receive the signage that is flexible signage, at least one of the plurality of support members being slidably adjustable along the torsion member.

15. The apparatus of claim 14, wherein the torsion member includes at least one of slots or apertures configured to receive signage that is rigid signage when the plurality of support members are detached from the torsion member.

16. An apparatus for supporting signage at a support structure, comprising:

a torsion member configured to be attached to the signage;

at least one base member configured to be attached to the support structure; and at least one hinge assembly that is disposed between the torsion member and the at least one base member, the at least one hinge assembly including a base hinge subassembly and a second hinge subassembly that are attached together;

wherein the base hinge subassembly is attached to the at least one base member;

wherein the second hinge subassembly is attached to the torsion member;

wherein the torsion member is rotatable in a first rotational direction about the second hinge subassembly and a second rotational direction about the base hinge subassembly, the first rotational direction being different from the second rotational direction;

wherein the base hinge subassembly includes a first bottom member and a first top member rotatably attached to each other via a first biasing housing, and the second hinge subassembly includes a second bottom member and a second top member rotatably attached to each other via a second biasing housing; and wherein when the torsion member rotates in the first rotational direction, then the torsion member and the second top member rotate relative to the at least one base member about the second biasing housing of the second hinge subassembly.

17. The apparatus of claim 16, wherein the first rotational direction is opposite to the second rotational direction.

18. The apparatus of claim 16, wherein a first spring that is disposed in the base hinge subassembly is configured to deform to store potential energy when the torsion member rotates in the second rotational direction.

19. The apparatus of claim 18, wherein a second spring that is disposed in the second hinge subassembly is configured to deform to store potential energy when the torsion member rotates in the first rotational direction.

20. The apparatus of claim 16, wherein the torsion member is rotatable 300 degrees about the at least one hinge assembly.

* * * * *